(12) United States Patent
Leung et al.

(10) Patent No.: US 11,949,848 B2
(45) Date of Patent: Apr. 2, 2024

(54) TECHNIQUES TO CAPTURE AND EDIT DYNAMIC DEPTH IMAGES

(71) Applicant: Google LLC, Mountain View, CA (US)

(72) Inventors: Mira Leung, Seattle, WA (US); Steve Perry, Mountain View, CA (US); Fares Alhassen, Redwood Shores, CA (US); Abe Stephens, San Mateo, CA (US); Neal Wadhwa, Mountain View, CA (US)

(73) Assignee: Google LLC, Mountain View, CA (US)

( * ) Notice: Subject to any disclaimer, the term of this patent is extended or adjusted under 35 U.S.C. 154(b) by 330 days.

(21) Appl. No.: 17/422,734

(22) PCT Filed: Nov. 19, 2019

(86) PCT No.: PCT/US2019/062156
§ 371 (c)(1),
(2) Date: Jul. 13, 2021

(87) PCT Pub. No.: WO2020/205003
PCT Pub. Date: Oct. 8, 2020

(65) Prior Publication Data
US 2022/0132095 A1   Apr. 28, 2022

Related U.S. Application Data

(60) Provisional application No. 62/827,739, filed on Apr. 1, 2019.

(51) Int. Cl.
*H04N 13/271* (2018.01)
*G06T 7/55* (2017.01)
(52) U.S. Cl.
CPC ............. *H04N 13/271* (2018.05); *G06T 7/55* (2017.01); *G06T 2207/10028* (2013.01)

(58) Field of Classification Search
CPC ................................ H04N 13/271; G06T 7/55
See application file for complete search history.

(56) References Cited

U.S. PATENT DOCUMENTS 7,480,382 B2   1/2009   Dunbar et al.
9,042,667 B2   5/2015   Venkataraman et al.
(Continued)

FOREIGN PATENT DOCUMENTS

CN   102257827   11/2011
CN   103329548   9/2013
(Continued)

OTHER PUBLICATIONS

"Korean Office Action in KR Application No. 10-2022-7037003", dated Jun. 7, 2023, 10 pages.
(Continued)

*Primary Examiner* — Mishawn N. Hunter
(74) *Attorney, Agent, or Firm* — IP Spring

(57) ABSTRACT

Implementations described herein relate to a computer-implemented method that includes capturing image data using one or more cameras, wherein the image data includes a primary image and associated depth values. The method further includes encoding the image data in an image format. The encoded image data includes the primary image encoded in the image format and image metadata that includes a device element that includes a profile element indicative of an image type and a first camera element, wherein the first camera element includes an image element and a depth map based on the depth values. The method further includes, after the encoding, storing the image data in a file container based on the image format. The method further includes causing the primary image to be displayed.

16 Claims, 6 Drawing Sheets

(56) References Cited

U.S. PATENT DOCUMENTS

| | | | |
|---|---|---|---|
| 9,467,607 | B2 | 10/2016 | Ng et al. |
| 9,501,806 | B2 | 11/2016 | Thakkar et al. |
| 9,817,207 | B2 | 11/2017 | Shigeta |
| 9,922,680 | B2 | 3/2018 | Vadakital et al. |
| 10,311,649 | B2 | 6/2019 | McMahon et al. |
| 10,390,005 | B2 | 8/2019 | Nisenzon et al. |
| 10,554,956 | B2* | 2/2020 | Das .................. H04N 13/271 |
| 11,503,267 | B2* | 11/2022 | Nakata .............. H04N 19/136 |
| 2009/0066693 | A1 | 3/2009 | Carson |
| 2013/0077880 | A1 | 3/2013 | Kartik et al. |
| 2015/0039621 | A1 | 2/2015 | Mikolajczyk et al. |
| 2015/0097987 | A1 | 4/2015 | Ferren |
| 2015/0254281 | A1 | 9/2015 | Sauve et al. |
| 2016/0205341 | A1 | 7/2016 | Hollander et al. |
| 2017/0213383 | A1 | 7/2017 | Lawler et al. |
| 2018/0300044 | A1 | 10/2018 | Abramson et al. |
| 2019/0012818 | A1* | 1/2019 | Fine ................... H04N 5/2624 |
| 2019/0266789 | A1* | 8/2019 | Rezaiifar ............ G06T 7/194 |
| 2021/0287385 | A1* | 9/2021 | Watson .............. G06T 7/50 |
| 2021/0375044 | A1* | 12/2021 | George .............. G06T 15/04 |

FOREIGN PATENT DOCUMENTS

| | | |
|---|---|---|
| CN | 104081414 | 10/2014 |
| CN | 105052124 | 11/2015 |
| CN | 105163042 | 12/2015 |
| CN | 105165008 | 12/2015 |
| CN | 105519105 | 4/2016 |
| CN | 106233329 | 12/2016 |
| CN | 106464860 | 2/2017 |
| CN | 106576160 | 4/2017 |
| CN | 108107571 | 6/2018 |
| JP | 2008-310696 | 12/2008 |
| JP | 2011-077764 | 4/2011 |
| JP | 2011-091481 | 5/2011 |
| JP | 2015-075675 | 4/2015 |
| JP | 2015-080199 | 4/2015 |
| JP | 2017-163587 | 9/2017 |
| KR | 10-2015-0053774 | 5/2015 |
| KR | 10-2015-0090364 | 8/2015 |
| KR | 10-2015-0140392 | 12/2015 |
| WO | WO2014037822 | 3/2014 |
| WO | 2018129692 | 7/2018 |

OTHER PUBLICATIONS

"Notification on the Grant of Patent Right for Invention in Chinese Application No. 201980059947.0", dated Jun. 19, 2023, 5 pages.

"Notification of the Second Office Action in CN Application No. 201980059947.0", dated Mar. 27, 2023, 8 Pages.

"Korean Notice of Office Action in KR Patent Application No. 10-2021-7007087", dated Feb. 24, 2022, 49 Pages.

"First Office Action in Chinese Application No. 201980059947.0", dated Nov. 3, 2022, 20 pages.

Notice of Allowance in Japanese Application No. 2021-514516, dated Feb. 14, 2023, 3 pages.

Dave Burke, "Introducing Android Q Beta", Android Developers Blog, https://android-developers.googleblog.com/2019/03/introducing-android-q-beta.html, Mar. 13, 2019, 12 Pages.

International Search Report and Written Opinion in International Application No. PCT/US19/62156, filed Nov. 19, 2019.

JPEG PLENO—Scope, use cases and requirements Ver.1.5, 72, JPEG Meetings; May 29, 2016-Mar. 6, 2016; Geneva; (Joint Picture Expert Group or ISO/IEC JTC1/SC29/WG1), No. wg1n72006, Jun. 3, 2016, XP030170227.

"Communication pursuant to Article 94(3) EPC in EP Application No. 19818412.9", dated Nov. 23, 2021, 9 pages.

"First Examination Report in IN Application No. 202147011760", dated Feb. 3, 2022, 6 pages.

"Non-Final Office Action in JP Application No. 2021-514516", dated Jul. 19, 2022, 6 Pages.

"Notice of Allowance in KR Application No. 10-2021-7007087", dated Aug. 4, 2022, 4 pages.

"International Preliminary Report of Patentability in PCT/US2019/062156", dated Oct. 14, 2021, 17 Pages.

"Communication pursuant to Article 94(3) EPC dated Aug. 30, 2023 in EP Application No. 19818412.9", 8 pages.

* cited by examiner

TECHNIQUES TO CAPTURE AND EDIT DYNAMIC DEPTH IMAGES

RELATED APPLICATIONS

This application is a § 371 national stage of PCT International Application No. PCT/US19/62156, filed Nov. 19, 2019, entitled, "Techniques to Captures and Edit Dynamic Depth Images" which claims the benefit of U.S. Provisional Application No. 62/827,739, filed Apr. 1, 2019, which is incorporated herein by reference in its entirety.

BACKGROUND

Users capture images using a variety of devices, e.g., mobile phones, wearable devices, smart appliances, smart speakers, tablets, computers, standalone cameras, etc. Many devices enable capture of images with enhanced information. For example, a user may capture a still image and depth information associated with the scene depicted in the still image. In another example, a user may capture a still image and one or more alternative representations of the still image, e.g., a burst mode image that includes a plurality of image frames. In yet another example, a user may capture an image with a small amount of motion, e.g., motion captured in a short period of 0-3 seconds during which the camera is activated. In yet another example, users may augment a scene with a virtual object, e.g., by inserting the object into the scene, prior to capture of an image, thus obtaining an augmented reality (AR) image.

Users may view or edit images using different types of devices, e.g., mobile phones, wearable devices, smart appliances, smart speakers, tablets, computers, standalone cameras, etc. Different devices may have different capabilities for display of images, e.g., two-dimensional or three-dimensional display. Different software applications used for image editing may include different features, e.g., a portrait effect (where one or objects of an image identified as subjects of the image are in focus, while other objects are blurred), a bokeh effect (where selected objects are in focus, while other parts of the image are blurred), etc. Some software applications may also include features to perform image segmentation, e.g., to identify one or more objects. Such applications may permit the user to modify the identified objects, e.g., by applying an effect (e.g., change to black-and-white or sepia, soften edges, etc.) to an identified object while other parts of the image are unchanged, or to extract the identified object, e.g., by a cut or copy operation, and insert the object into another image.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations relate to a computer-implemented method that includes capturing image data using one or more cameras. image data includes a primary image and associated depth values. The method further includes encoding the image data in an image format. The encoded image data includes the primary image, encoded in the image format, and image metadata that includes a device element that includes a profile element indicative of an image type and a first camera element. The first camera element includes an image element and a depth map based on the depth values. The method further includes storing the image data in a file container based on the image format. The method further includes causing the primary image to be displayed.

In some implementations, the depth map comprises a plurality of pixel values, each pixel value indicative of a respective distance from a particular camera of the one or more cameras. In some implementations, the depth map further comprises a lens focal model that defines a respective radius value of a circle of confusion corresponding to a plurality of distances from the particular camera. In some implementations, the plurality of distances include a near distance and a far distance, wherein the near distance is smaller than the far distance. In some implementations, the plurality of distances further include a focus distance that is larger than the near distance and smaller than the far distance.

In some implementations, the method further includes obtaining the plurality of pixel values by converting the depth values to an integer format and compressing the converted depth values based on the image format.

In some implementations, the image data may further include one or more secondary images. In some implementations, each secondary image may be captured by a respective camera of the one or more cameras different from the particular camera. In some implementations, the image metadata may further include one or more additional camera elements wherein each additional camera element corresponds to at least one image of the one or more secondary images and includes a respective image element that includes a pointer to the at least one image. In some implementations, the one or more additional camera elements are organized sequentially in the image metadata after the first camera element. In some implementations, storing the image data in the file container comprises concatenating the primary image and the one or more secondary images, encoded in the image format. In some implementations, an order of the primary image and the one or more secondary images in the file container is same as the order of the one or more additional camera elements in the image metadata.

In some implementations, the image data may further comprise one or more secondary images that are each captured by a respective camera of the one or more cameras. In some implementations, the one or more secondary images may include a depth image captured by a depth camera or a video.

Some implementations relate to a computer-implemented method that includes obtaining image data from a file container. The image data includes a plurality of pixel values corresponding to a primary image and image metadata that comprises a lens focal model. The method further includes causing the primary image to be displayed. The method further includes receiving user input indicative of a target focal distance. The method further includes, in response to the user input, modifying one or more pixel values of the primary image based on the lens focal model to obtain a modified image such that objects in the modified image that are at the target focal distance are in focus. The method further includes causing the modified image to be displayed.

In some implementations, the lens focal model may define a respective radius value of a circle of confusion corresponding to a plurality of distances from a camera that captured the primary image. In these implementations modifying the one or more pixel values causes one or more objects in the primary image to be blurred, wherein the one or more objects are associated with depth data that indicates that the one or more objects are at a different distance from the camera that captured the primary image than the target focal distance.

In some implementations, the lens focal model may be stored in the file container in a depth map element in image metadata. In some implementations, the depth map element may correspond to a camera that captured the primary image.

Some implementations relate to a computer-implemented method that includes obtaining image data from a file container. The image data includes a plurality of pixel values corresponding to a primary image and image metadata that includes a depth map. The method further includes causing the primary image to be displayed. The method further includes receiving user input indicative of at least one of a crop operation on the primary image or a scale operation on the primary image. The method further includes modifying the primary image based on the user input to obtain a modified image. The method further includes calculating an updated depth map, wherein the updated depth map includes depth data corresponding to the modified image. The method further includes updating the file container to replace the primary image with the modified image and the depth map with the updated depth map.

Some implementations relate to a computer-implemented method that includes obtaining image data from a file container. The image data includes a plurality of pixel values, each pixel value corresponding to a particular pixel of a plurality of pixels of a primary image, and image metadata that comprises a plurality of depth maps. The method further includes generating a three-dimensional image based on the primary image and the plurality of depth maps. The method further includes causing the three-dimensional image to be displayed.

In some implementations, the method further includes receiving user input indicative of a tilt operation, or a pan operation for the three-dimensional image. The method further includes, in response to receiving the user input, generating an updated three-dimensional image based on the user input, the primary image, and the plurality of depth maps. The method further includes causing the updated three-dimensional image to be displayed.

In some implementations, the plurality of depth maps may be obtained by using depth from motion techniques using a single camera. In some implementations the plurality of depth maps may be obtained via one or more depth cameras.

Some implementations relate to a computer-implemented method that includes obtaining image data from a file container. The image data includes a plurality of pixel values, each pixel value corresponding to a respective pixel of a plurality of pixels of a primary image, and image metadata that comprises a depth map. The method further includes causing the primary image to be displayed. The method further includes receiving user input indicative of selection of an object depicted in the primary image. The method further includes generating a segmentation mask based on the depth map. The segmentation mask may identify a subset of pixels of the primary image that correspond to the object. The method further includes obtaining an object image of the object based on the segmentation mask. The method further includes providing a user interface that enables selection of the object image.

In some implementations, the depth map includes a plurality of depth values, each corresponding to a particular pixel of the primary image. In some implementations, generating the segmentation mask comprises selecting pixels of the primary image with respective depth values that are within a threshold range of depth values.

Some implementations relate to a computing apparatus, a computing system, or a computing device to perform any of the methods described above. Some implementations relate to a computer-readable storage medium with instructions stored thereon or a computer program comprising instructions, wherein the instructions, when executed by one or more processors, cause the one or more processors to perform the methods described above.

DETAILED DESCRIPTION

Depth images and augmented reality images are increasingly popular camera use cases across mobile devices and operating systems. However, there is a lack of standardization in capturing, saving, sharing, and editing such images. Depth images created using a camera application may not be editable by other applications.

The techniques described herein provide a uniform and consistent framework within a camera framework used by various client devices to store image metadata and/or additional images in a single concatenated file container. Images that are stored using the techniques described herein can be accessed for viewing and/or editing by any application. The techniques described herein can therefore provide improved interoperability between applications and/or devices when capturing, saving, sharing, or editing depth images and/or augmented reality images.

The techniques are easy to implement, quick to parse, and extend existing image formats across various operating systems used in cameras, including mobile device cameras, and in software, including mobile, and personal computing device software. The techniques enable storing device-related metadata, e.g., depth information, imaging model of a device camera, etc. in the image metadata of a captured image, along with any number of secondary images. The stored metadata and secondary images can be utilized by any image viewing or editing application.

Figure 1:
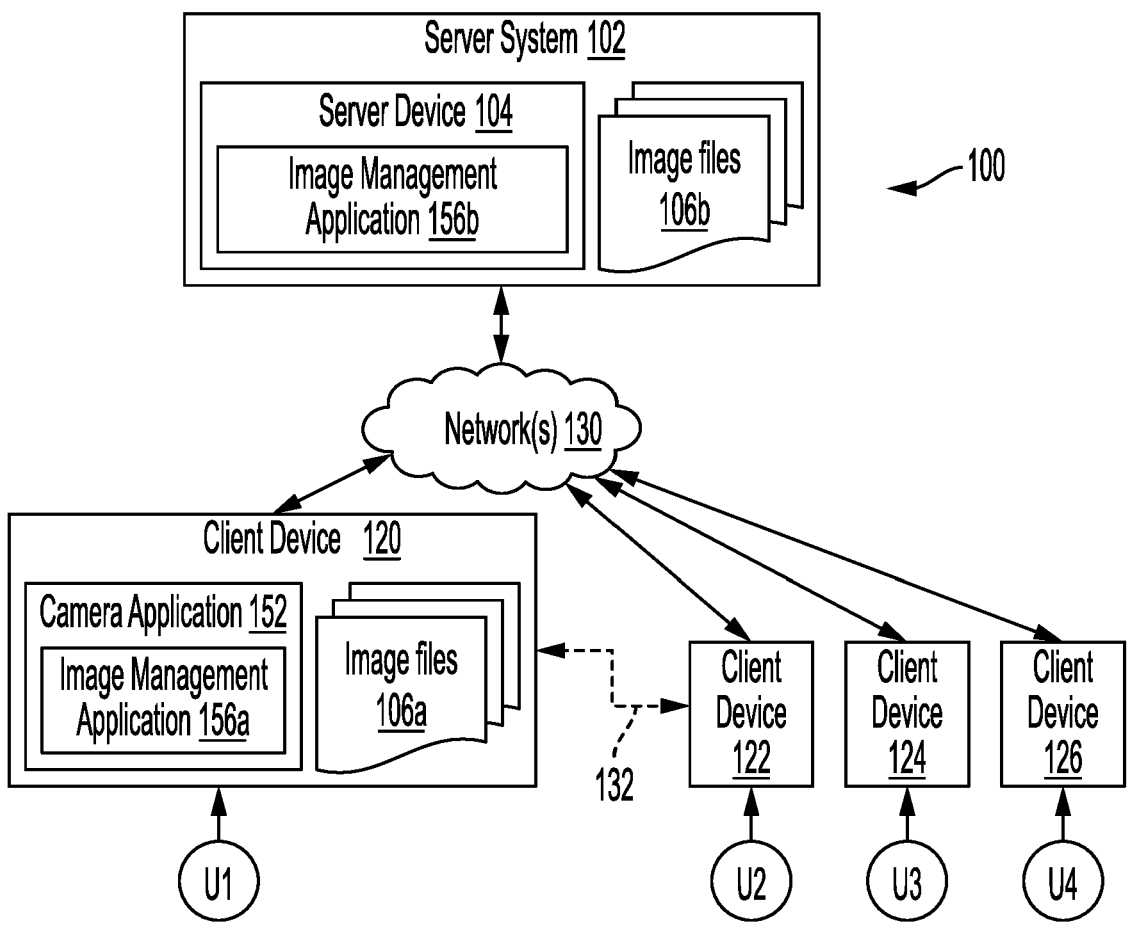
FIG. 1 is a block diagram of an example network environment which may be used for one or more implementations described herein.

FIG. 1 uses like reference numerals to identify like elements. A letter after a reference numeral, such as "156a," indicates that the text refers specifically to the element having that particular reference numeral. A reference numeral in the text without a following letter, such as "156," refers to any or all of the elements in the figures bearing that reference numeral (e.g. "156" in the text refers to reference numerals "156a" and/or "156b" in the figures).

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a storage device (not shown). Server system 102 may store one or more image files 106b. In some implementations, server device 104 may provide an image management application 156b. Image management application 156b may access the image files 106b, with permission of a user that provided respective image files 106b.

Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communications between two client devices 120 and 122 is shown by arrow 132.

For ease of illustration, FIG. 1 shows one block for server system 102 and server device 104, and shows four blocks for client devices 120, 122, 124, and 126. Server blocks 102 and 104 may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, one or more storage devices can be provided in server system block(s) that are separate from server device 104 and can communicate with server device 104 and other server systems via network 130.

There may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also include local image files 106a, e.g., captured using a camera of the client device, or obtained in other ways, e.g., by downloading image files from a server. In some implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102 via a network service, e.g., a social network service, an image hosting service, or other type of network service, implemented on server system 102. For example, respective client devices 120, 122, 124, and 126 may communicate data to and from one or more server systems, e.g., system 102.

In some implementations, the server system 102 may provide appropriate data to the client devices such that each client device can receive communicated content or shared content uploaded to the server system 102 and/or network service. In some examples, users U1-U4 can interact via audio or video conferencing, audio, video, or text chat, or other communication modes or applications. A network service implemented by server system 102 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide a camera application 152 and image management application 156a. Client devices 122-126 may also provide similar applications. For example, camera application 152 may provide a user of a respective client device (e.g., users U1-U4) with the ability to capture images using one or more cameras of their respective client device. For example, camera application 152 may be a software application that executes on client device 120.

In some implementations, camera application 152 may provide a user interface. For example, the user interface may enable a user of client device 120 to select an image capture mode, e.g., a static image (or photo) mode, a burst mode (e.g., capture of a successive number of images in a short time period), a motion image mode, a video mode, a high dynamic range (HDR) mode, etc. In some implementations, camera application 152 may implement (e.g., partially or wholly) the methods described herein with reference to FIGS. 4 and 5. In some implementations, image management application 156a and/or image management application 156b may implement (e.g., partially or wholly) the methods described herein with reference to FIGS. 4 and 5.

Camera application 152 and image management application 156a may be implemented using hardware and/or software of client device 120. In different implementations, image management application 156a may be a standalone application, e.g., executed on any of client devices 120-124, or may work in conjunction with image management application 156b provided on server system 102. Image management application 156 may enable a user to view and/or edit images, e.g., image files 106.

With user permission, image management application 156 may perform one or more automatic functions such as storing (e.g., backing up) the image on a server, editing the image, automatically enhancing the image, stabilizing the image, recognizing one or more features in the image, e.g., a face, a body, a type of object, a type of movement, etc.

Image management application 156 may also provide image management functions such as displaying images in a user interface (e.g., in a one-up view that includes a single image, in a grid view that includes multiple images, etc.), editing images (e.g., adjusting image settings, applying filters, changing image focus, applying a portrait effect, applying a bokeh effect, applying other effects, viewing a three-dimensional image with pan/tilt operations, extracting an object from an image using image segmentation techniques, etc.), sharing images with other users (e.g., of client devices 120-126), archiving an image (e.g., storing the image such that it does not appear in a primary user interface), generating image-based creations (e.g., collages, photo books, motion-based artifacts such as animations, stories, video loops, etc.), etc. In some implementations, to generate an image-based creation, image management application 156 may utilize one or more labels associated with an image or image metadata stored in the image.

A user interface on a client device 120, 122, 124, and/or 126 can enable display of user content and other content, including images, video, data, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

In some implementations, any of server system 102 and/or one or more client devices 120-126 can provide a communication application program. The communication program may allow a system (e.g., client device or server system) to provide options for communicating with other devices. The communication program can provide one or more associated user interfaces that are displayed on a display device associated with the server system or client device. The user interface may provide various options to a user to select communication modes, users or devices with which to communicate, etc. In some examples, the communication program can provide an option to send or broadcast a content post, e.g., to a broadcast area, and/or can output a notification indicating that a content post has been received by the device and, e.g., the device is in the defined broadcast area for the post. The communication program can display or otherwise output transmitted content posts and received content posts, e.g., in any of a variety of formats. Content posts can include, e.g., images, shared with other users.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display data (e.g., content) stored on storage devices local to the client device, e.g., received previously over communication networks.

Figure 2A:
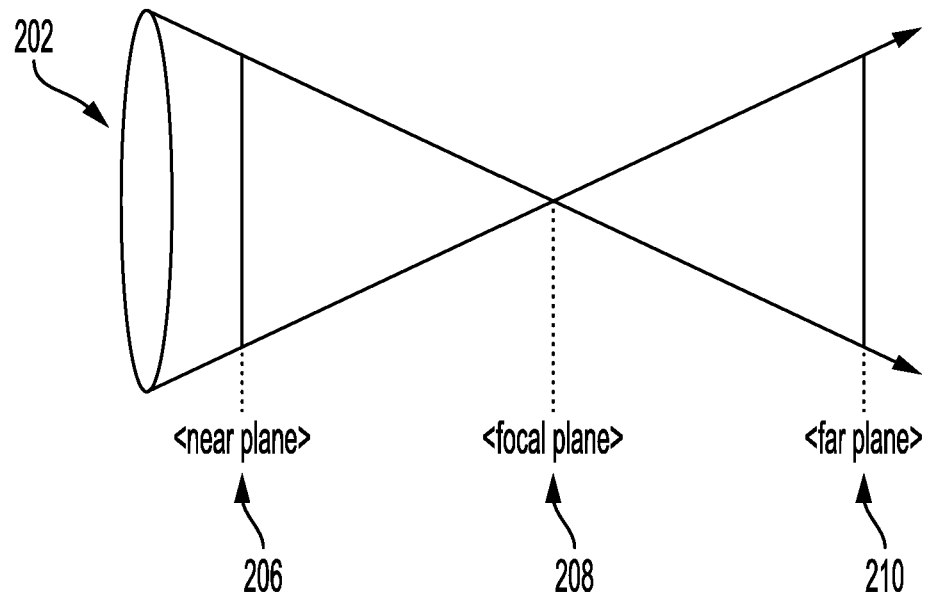
FIG. 2A illustrates an example of image capture with a camera, according to some implementations.

FIG. 2A illustrates an example of image capture with a camera. As illustrated in FIG. 2A, a camera with lens 202 may be used to capture an image. While FIG. 2A illustrates lens 202, the camera may include other elements, e.g., an imaging sensor, a focal length adjustment apparatus, etc. that are not shown in FIG. 2A. At the time of image capture, the camera is focused on focal plane 208. The captured image may include a plurality of objects, at different distances from the lens 202 (different distances from the camera). For example, the captured image may include one or more objects in a near plane 206, in the focal plane 208, in a far plane 210, and at any intermediate plane.

A single device (e.g., any of client devices 120-126) that is used for image capture may include one or more cameras or imaging sensors. For example, a device may include one or more cameras (e.g., RGB cameras) that can be used to capture a color image, an infrared camera, etc. For example, the one or more cameras may include cameras with different configurations, e.g., a telephoto camera, a wide angle camera, etc. Other configurations of cameras may also be used. Each camera may generate a corresponding image. In some implementations, image data obtained from different cameras of a device may be combined to obtain a primary image. The primary image may be displayed, e.g., on a screen of the device. Further, per techniques described herein, the primary image may be stored in an image format, e.g., JPEG, PNG, TIFF, HEIF, etc. Further, per techniques described herein, one or more images obtained from individual cameras may be stored in a container, as described below with reference to FIG. 3.

Figure 2B:
FIG. 2B illustrates an example image captured with a camera and a corresponding depth image.

FIG. 2B illustrates an example image 220 captured with a camera and a corresponding depth image 230. For example, the depth image may be captured using an infrared camera or other depth sensor. In another example, the depth image may be generated based on image data captured with camera that captured the image 220.

As seen in FIG. 2B, image 220 depicts a scene that includes a flower closer to the camera than leaves that are seen in the background. Correspondingly, in depth image 230, petals of the flower that are closer to the camera are seen in darker shade than other petals that are further from the camera, and leaves that are still further away from the camera. In depth image 230, darker shades correspond to objects in the scene that are closer to the camera and lighter shades correspond to objects that are further away.

Depth image 230 may be an image of scalar values (e.g., integer values, real or floating point values, etc.) that represent the distance from the camera viewpoint, to the object viewed in a corresponding image (e.g., image 220). The definition of the depth value may vary based on the type of depth sensor. As an example, two common definitions are depth along the optical axis (typically the z-axis) from the camera that captured the image, and depth along the optical ray passing through each pixel during capture of the image.

Figure 3:
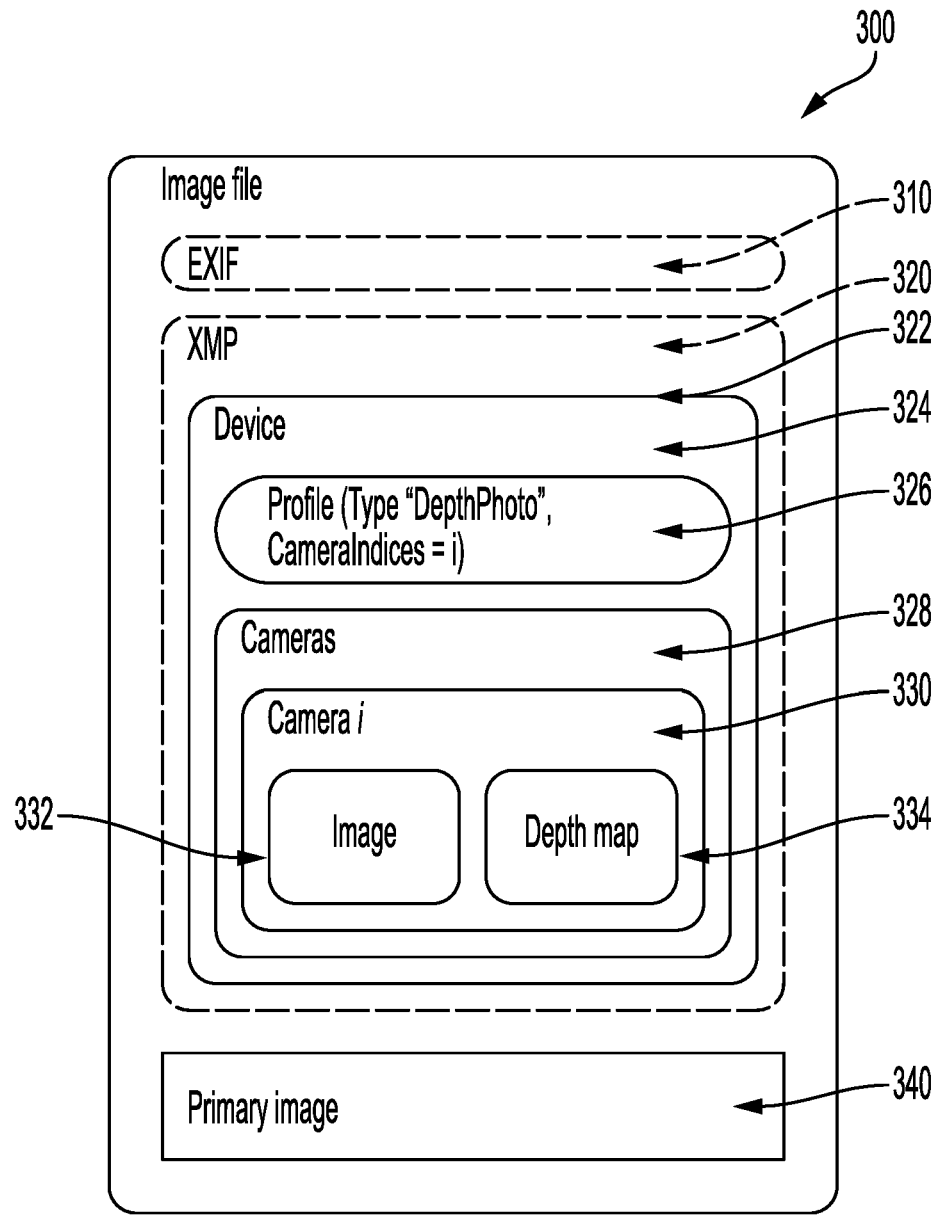
FIG. 3 illustrates an example image file that includes a metadata structure to store dynamic depth information.

FIG. 3 illustrates an example image file 300 that includes a metadata structure to store dynamic depth information. The structured metadata can be utilized for an image that includes depth information. In some implementations, image file 300 may be stored as a concatenated file container that comprises a composite or concatenated file where a primary image has zero, one, or more secondary media files appended to it. In the example illustrated in FIG. 3, a primary image 340 and associated metadata 310, and XMP (eXtensible Metadata Platform) metadata 320 are shown. In some implementations, the secondary media files may include alternative representations of the primary image or related media such as depth data.

Image file 300 can be any type of image, e.g., JPEG, PNG, TIFF, HEIF, etc. Image file 300 includes a primary image 340. Image file 300 may further include metadata 310, e.g., EXIF (Exchangeable Image File Format) data. The EXIF data can include one or more settings such as ISO speed, shutter speed, aperture, white balance, lens type, focal length, date and time, etc.

In some implementations, image file 300 may be stored as an ISO Box Media File Format Container, based on ISO/IEC 14496-12. In these implementations, the XMP metadata in the container includes a Container XMP metadata directory element where each item in the directory uses a URI (Uniform Resource Identifier) to refer to boxes within the ISO/IEC 14496-12 container.

In some implementations, a container element encoded into the XMP metadata of the image file may define the directory of media items in the container. In some implementations, the concatenated media items are located in the container file in the same order as the media item elements in the directory. In some implementations, the concatenated media items are tightly packed, e.g., data corresponding to different media items are placed consecutively in the file container without gaps. For example, an image file may include bytes corresponding to concatenated media items, concatenated after the primary image (e.g., primary image 340).

Primary image 340 may be a display-ready image, such as a JPEG image or an image in another format. Image file 300 may include secondary images such as depth data, intermediate images, or alternative representations of the primary image, or may include other media items (e.g., one or more videos, text, etc.). The secondary images and/or media items may be stored in a concatenated file container, as described above. In some implementations where image file 300 is an ISO/IEC 14496-12 ISO Box media file format container, secondary images may be stored as other boxes in the container.

Image file 300 may further include XMP (eXtensible Metadata Platform) metadata 320. XMP metadata 320 may include data that specifies one or more devices, e.g., Device element 324. The metadata may be serialized, e.g., by following ISO 16684-1:2011 (E) XMP Specification Part 1 and embedded inside image file 300, e.g., as described in Adobe XMP Specification Part 3 Storage in Files. In some implementations, the image file 300 may include the following items, formatted as RDF/XML (Resource Description Framework/eXtensible Markup Language).

In some implementations, XMP metadata 320 (also referred to as a container XMP metadata directory) may define the order and properties of subsequent media files in the concatenated file container. Each element may be of the structure Container:Item and may define the layout and contents of the container. A container type may be for example, a "Device" element, a "Camera" element, etc. Each file (e.g., other images, video, text, etc.) in the concatenated container may have a corresponding media item in the directory. The media item may describe the location in the file container and the basic properties of each concatenated file in the concatenated file container. In some implementations, media items in the container directory may be referred to by ItemURI (Uniform Resource Identifier)) attributes from Image or Depth Map elements in the metadata. The URI may be based on a namespace, e.g., using a default namespace prefix is Container. The directory includes only a single primary image which is the first item in the directory. An Item element includes a description of each item, usable by an application.

In some implementations, the root metadata object in XMP data 320 may include a Device element (324), also referred to as device 324. In some implementations, Device element 324 is mandatory, e.g., at least one device 324 is always included in XMP data 320. In some implementations, more than one device elements can be included.

Device element 324 may be specified in accordance with one or more profiles or use cases. Each profile may have a corresponding set of required elements and data. The profiles may be usable by applications, e.g., the camera application that generated image file 300, or other applications, e.g., image backup, viewing or editing applications, that access image file 300. For example, the profiles may be usable to identify the use cases a particular image file can support. Image file 300 may include one or more profiles. In some implementations, each profile may correspond to a particular use case and may have a corresponding set of required elements and data. Applications that access image file 300, e.g., to enable users to view or edit the image, can utilize the profile(s) to identify the use cases a given image file can support.

In the example illustrated in FIG. 3, XMP metadata 320 of image file 300 includes a single device element 324 that includes a Profile element 326 (also referred to as Profile 326) of profile type "DepthPhoto." Further, Profile 326 indicates the number of cameras ("cameraindices=i" where i is an index value) from which image data of image file 300 was obtained, e.g., at the time of image capture (or creation). In some implementations, e.g., in which the camera index is zero, the primary image may be the same as the image referred to in the camera element. In some implementations, it may be mandated that a profile of the profile type "DepthPhoto" include at least one Profile element 326 and at least one camera element (e.g., "Cameras 328"). In the example illustrated in FIG. 3, Cameras 328 (also referred to as Cameras element 328) is depicted as including a camera element 330 (Camera i). In some implementations, Cameras 328 is a sequence of one or more camera elements.

In some implementations, each camera element (e.g. Camera element 330) includes an image element 332 for the image provided by the camera and a depth map element 334 (also referred to as Depth Map 334). Image element 332 may include an attribute "Primary" that indicates whether the image element correspond to primary image 340 in the concatenated file container. In some implementations, image element 332 may include an attribute "Original" that indicates whether the media item referred to by the image element 332 is an original version, e.g., an unfiltered color image that is usable to render a depth effect. In some implementations, image element 332 may include an attribute "Raw" that indicates that the media item, e.g., image, referred to by the image element 332 is a raw version that is not display ready and can be processed to obtain a display ready image. In some implementations, image element 332 may include an attribute "Depth" that indicates that the media item, e.g., image, referred to by the image element 332 includes a depth image.

Depth Map 334 may include depth-related information and/or a depth map for the image provided by a corresponding camera. In some implementations, image element 332 and/or depth map element 334 may include a URI (uniform resource identifier) that points to the location of the corresponding image data and/or depth data stored in image file 300, e.g., in the concatenated file container. Depth data for the first camera must have no holes. An application that generates the image file encodes an estimated value in a region of the image where the depth value is not available or cannot be calculated.

In some implementations, a depth image includes a plurality of values, each corresponding to a particular pixel of the depth image. Depth information, e.g., in floating pointer or 32-bit integer format, is converted into an integer format and compressed using an image codec that is supported by the file container type (e.g., JPEG). Conversion to integer format can be performed in different ways, including a linear range conversion and an inverse range conversion. For example, inverse conversion may be utilized if there is a loss in depth map precision when encoded, e.g., converting floating point depth values to 16-bit integers.

Linear conversion (RangeLinear): d is the depth distance value of a pixel, and near and far the minimum and maximum depth values possible. The depth value is first normalized to the [0, 1] range using the formula:

$$d_n = \frac{d - \text{near}}{\text{far} - \text{near}}$$

Then, the depth values are quantized to 16 bits using the formula:

$$d_{16bit} = \lfloor d_n \cdot 65535 \rfloor$$

Depth is recovered from a quantized depth value $d_n$ using the formula:

$$d = \frac{\text{far} \cdot \text{near}}{\text{far} - d_n \cdot (\text{far} - \text{near})}$$

Inverse conversion (RangeInverse): RangeInverse allocates more bits to the near depth values and fewer bits to the far values. The depth value is first normalized to the [0, 1] range using the formula:

$$d_{16bit} = \lfloor d_n \cdot 65535 \rfloor$$

Then, the depth values are quantized to 16 bits using the formula:

$$d = d_n \cdot (\text{far} - \text{near}) + \text{near}$$

Depth is recovered from a quantized depth value $d_n$ using the formula:

$$d_n = \frac{\text{far} \cdot (d - \text{near})}{d \cdot (\text{far} - \text{near})}$$

In some implementations, Depth Map 334 may include a lens focal model for the depth data. In some implementations, the lens model may include metadata, e.g., stored in a FocalTable attribute. The metadata may be used by applications, e.g., to render a depth-of-field effect. The lens model defines the radius of the circle of confusion at different distances from the viewer, e.g., the camera that captured an image. The FocalTable may include distance and radius pairs that are usable to construct a lookup table defining the circle of confusion as a function of depth distance value.

In some implementations, the FocalTable attribute may be a string value consisting of base-64 encoded little endian floating point pair that are actual distance values. These <distance>, <radius> pairs define a lookup table that is usable, e.g., by an image viewing or editing application, to compute the radius of the circle of confusion at distance values between the near and far values of the depth map.

In some implementations, the distance-radius pairs are stored in ascending order, sorted by the distance value. In some implementations, distance coordinates may be defined in depth map distance value units. In some implementations, radius values may be defined in pixel coordinates. Each radius value is greater or equal to zero. The radius value zero may denote an in-focus depth distance on the focal plane of the image. The lookup table includes at least two pairs, e.g., a first pair corresponding to the near distance and a second pair corresponding to the far distance of the depth map. In some implementations, radius values may be interpolated (e.g., linearly interpolated) between points defined in the FocalTable to obtain the radius of the circle of confusion at any focal distance from the camera that captured the image.

In some implementations, FocalTable may include three radius values—a near value for the near plane, a focal plane value for the focal plane, and a far value for the far plane. Image viewing applications may access FocalTable and render objects that are at the focal plane depth value in-focus. In some implementations, a FocalTable may include two or more distance values as in focus, e.g., corresponding to the focal plane.

In some implementations, primary image 340 is associated with the first camera in Cameras element 328. In some implementations, the first camera element that is listed in Cameras 328 may be a primary camera, e.g., a primary camera of a device such as a smartphone or tablet. In some implementations, additional camera elements may correspond to other cameras of the device, e.g., an infrared camera of the smartphone or tablet device. The order of other cameras may be arbitrary. In some implementations, each additional Camera element may include corresponding Pose elements indicating the pose for the camera relative to the device. In some implementations, all images and depth maps within a single Camera element may be rectified by that same Camera, e.g., the elements have the same pose, proportions, and field of view.

If image file 300 is modified by an image editing application, e.g., cropped, scaled, etc., one or more Camera elements may be updated to reflect the modifications to the image, e.g., to update the depth map and the image element of the Camera element.

In some implementations, image file 300 may include information about the image capture, such as pose that includes the position and orientation of the imaging sensor(s) or camera(s) that captured the image relative to the scene. Inclusion of this information can enable applications to use images from multiple cameras (e.g., an image from a color image camera and a depth image from a depth sensor) together. For example, the pose information can enable an application to map depth data (which may be of a different resolution) on an image.

In some implementations, Device 324 may include one or more other elements. For example, such elements may include a Container element that is an ordered directory of concatenated files in the file container, a VendorInfo that includes vendor-related information for the device, an AppInfo element that includes application-specific or rendering information for the device, etc.

In some implementations, a camera element 330 may include one or more additional elements, e.g., a VendorInfo element that include vendor-related information for the camera, an AppInfo element that includes application-specific or rendering information for the camera, an image element that includes an image provided by the camera (e.g., a depth image), an ImagingModel element that describes an imaging model of a camera lens. For example, the ImagingModel element may be used to describe a fisheye distortion model, or a standard pinhole camera model with 5-DoF radial distortion. In some implementations, the ImagingModel element may indicate focal length along the X axis and the Y axis, normalized by the dimension of the imaging sensor, expressed as a real number; principal points (X position and Y position) where the camera optical axis crosses the image plane center of the camera along the X and Y axis respectively, normalized by the sensor height; the image width and height expressed in pixels; skew of the camera, e.g., the clockwise angle by which the y axis of the image slants away from the vertical, expressed in degrees; a pixel aspect ratio of the pixel width to pixel height; and one or more distortion parameters. When an image is edited, e.g., scaled or cropped, the ImagingModel element may be updated accordingly.

An Item structure may define the layout and contents of the container within which the item is included, e.g., in the form Container:Item. For example, a "Profile" container element may include "type and "cameraindices" items, as illustrated in FIG. 3. In another example, a "Camera" element may include an "image" item that includes a URI to the corresponding image in the file container, a "depth map" item that includes a depth map for the image, etc. Each item element includes information that enables an image backup, viewing, or editing application, e.g., to enable a user to view or edit an image.

In some implementations, the first media item in the directory is primary image 340. The primary image element has an associated field to indicate the MIME type. The field may be a simple string that indicates the MIME type of the media item in the container. For example,

TABLE 1

| Attribute value | Description |
| --- | --- |
| image/jpeg | JPEG Image |
| image/png | PNG Image |
| image/tiff | TIFF compatible image |
| image/heif, image/heic | HEIF image |

Further, if included, a length field in the primary image element may be set to a value of zero. In implementations where the primary image is the first file in the file container, an application may determine the length of the primary image, e.g., by parsing the primary image based on the indicated MIME type, starting at the beginning of the file container.

The first media item in the XMP metadata may optionally include a Padding attribute that specifies additional padding between the end of encoded primary image and the beginning of the first secondary image.

In some implementations, where the media items are tightly packed, subsequent media items for secondary images do not include a Padding attribute. Each media item (e.g., images other than primary image 340) has a corresponding MIME type attribute and a Length attribute. The length attribute may be an integer value and may be required for secondary media items. In some implementations, the length attribute may be a simple string that includes a positive integer length that indicates the number of bytes of the item in the corresponding file in the concatenated file container. In general, an Item element includes a Mime attribute that one of the image MIME types listed in Table 1. In some implementations, sequential media items may share resource data within the file container. The first media item may indicate the location of the resource in the file container, and subsequent shared media items may have a length attribute set to 0. In the case that the resource data is itself a container, DataURI may be used to determine the location of the media item data within the resource. An application may determine the location of media item resources in the concatenated file container by summing the lengths of the preceding secondary item resources to the length of the primary image encoding plus the padding value of the primary image, if specified.

The below table describes examples of various attributes that may be included in an Item element:

TABLE 2

| Attribute Name | Type | Description |
| --- | --- | --- |
| Mime | String | Each item has an associated MIME type. The attribute value may be a simple string that indicates the MIME type of the media item in the container, e.g., one of the values from Table 1 or a "text/plain" value for text data. |
| Length | Integer | A length attribute may be mandatory for secondary media items. The length attribute may be a simple string that includes a positive integer length in bytes of the item. Media items in the file container are in their original form, with no encoding applied. The length value is the actual length of the bytes in the file in the concatenated file container. A length value of zero in secondary media items may indicate that the media item resource is shared with the previous media item. The length attribute is set to zero for a primary media item. |
| Padding | Integer | Optional for the primary media item. The padding attribute may be a simple string that includes a positive integer length in bytes of additional padding between the end of encoded primary image and the beginning of the first secondary image. |
| DataURI | String | A DataURI item may be included in a container if there is an element that references the Container, e.g., an element of type Image, Depth Map, or AppInfo. In some implementations, a DataURI may be a directory path. The URI string may include a relative URI of the media data inside the media item resource. |

In some implementations, XMP metadata may specify parameters for an augmented reality (AR) image. The profile type for an AR image may be "ARPhoto" Such parameters may include, e.g., a pose of the client device that captured the AR image, lighting estimate information, horizontal and/or vertical surface planes in the scene (e.g., floor, walls, etc.), camera intrinsics, etc. Further, AR parameters may include application-specific metadata, e.g., provided by an image capture or augmented reality application. Such application-specific metadata can include identifier(s) of three-dimensional (3D) assets, e.g., one or more virtual objects that are utilized to augment the real world scene depicted in the AR image, and corresponding poses.

Further, in some implementations, one or more images can be embedded inside an image file used for augmented reality images. An example use case of such embedding is when the embedded image is one without 3D assets and the container, e.g., the primary image, includes the 3D assets. This enables users to preview a thumbnail with the 3D assets, e.g., in an image gallery, while enabling the viewing or editing application to provide user interfaces that enable users to interact and move virtual objects in an augmented reality image. In this example, when the user saves the augmented reality image after editing, the primary image may be updated. In this example, the XMP metadata stores the embedded image in a camera with index greater than index 0. If there is no embedded image, camera 0 includes the AR metadata.

Other types of profiles, e.g., different from "depthphoto" and "ARphoto" may also be specified in the XMP metadata to support other functionality and use cases.

In some implementations, an application such as a camera application on a mobile device may generate image file 300, e.g., using camera hardware of a client device (e.g., any of client devices 120-126). In these implementations, the camera application may generate image file 300 in the format described above. To generate image file 300, image data may be obtained from imaging sensors, e.g., hardware sensors (e.g., CCD, CMOS, infrared, etc.).

Image data obtained from the imaging sensors may be modified, e.g., by the camera application, such that the primary image and one or more other images (e.g., each corresponding to a camera i) in the image file 300 have the same pose and the same aspect ratio. For example, the primary image and the one or more other images may be cropped to the same aspect ratio. In some implementations, e.g., when depth information is available from one or more cameras, image file 300 may include depth maps. In some implementations, the resolution of the depth map may be the same as the resolution of the primary image and the one or more other images. In some implementations, the resolution of the depth map may be different than the resolution of the primary image and the one or more other images. In some implementations, the one or more other images may be stored image file 300 and referred to in additional camera elements.

An image file that is a concatenated file container with XMP metadata as described herein enables image backup, viewing, or editing applications to present media, e.g., a depth photo, an augmented reality photo, etc. in a manner that is consistent with the generation of the image, e.g., capture using one or more imaging sensors of a client device. Further, inclusion of the primary image in the file container enables applications or services that are incapable of interpreting the XMP metadata to obtain a display ready version of the image.

Figure 4:
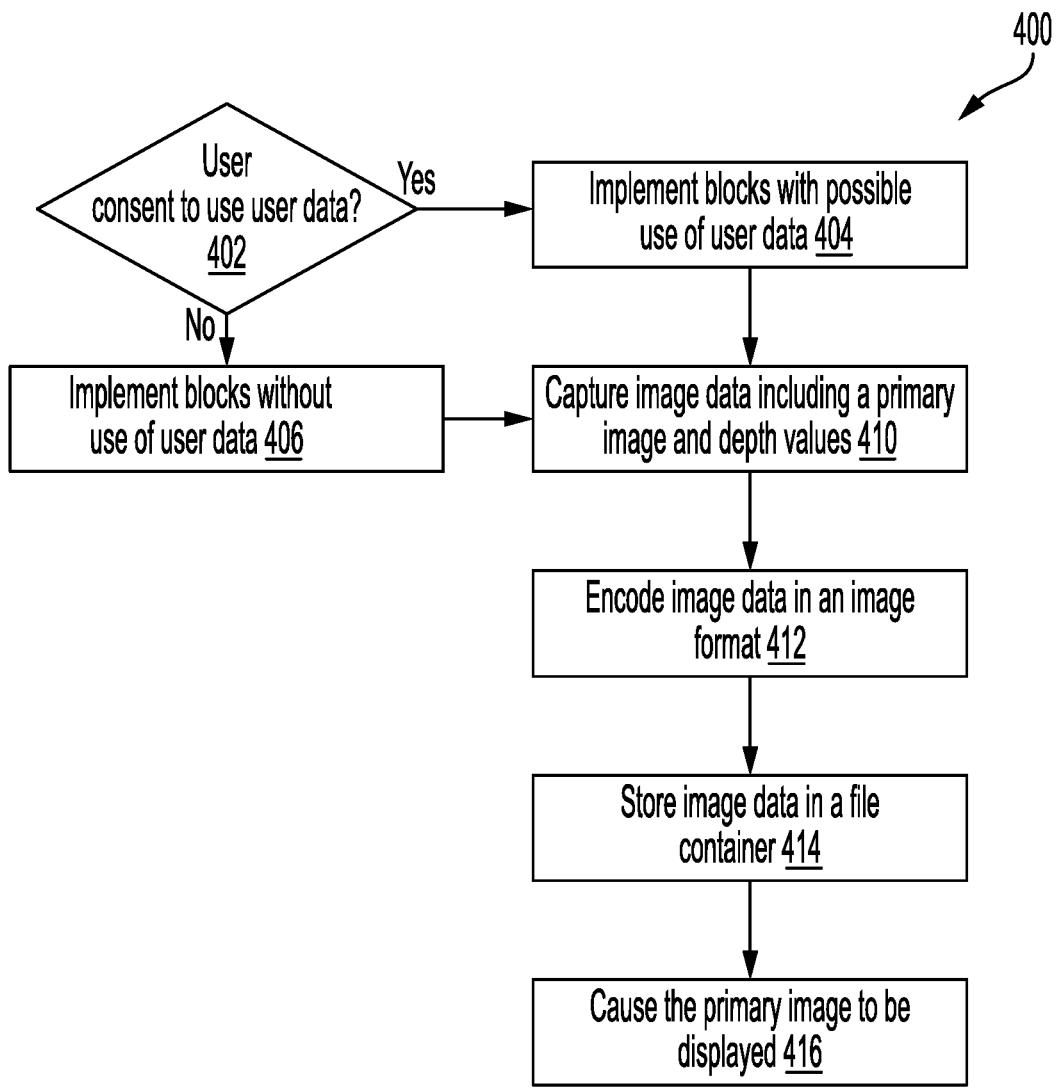
FIG. 4 is a flow diagram illustrating an example method, according to some implementations.

FIG. 4 is a flow diagram illustrating an example method 400, according to some implementations. In some implementations, method 400 can be implemented, for example, on a server system 102 as shown in FIG. 1. In some implementations, some or all of the method 400 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices. In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

In various implementations, client device 120 can be a standalone camera, another device that includes a camera, e.g., smartphone, tablet, computer, wearable device such as a smartwatch, a headset, etc., or other client device that can receive images or videos captured by another device. In some implementations, client device 120 may be a capture-only device, e.g., a camera that does not include a screen. In some implementations, client device 120 may be a view-only device, e.g., a device that includes a screen on which images or videos can be displayed, but that does not have a camera or other capability to capture images or videos. In some implementations, client device 120 may have both capture and viewing capability.

In some implementations, client device 120 may include a single camera to capture images or videos. In some implementations, client device 120 may include a plurality of cameras (or lenses). For example, a smartphone or other device may include one or more front-facing cameras (on the same side of the device as a screen) and/or one or more rear-facing cameras. In some implementations, the one or more front-facing or rear-facing cameras may operate together during capture, e.g., a first camera may capture depth information and a second camera may capture image pixels of the image or video. In some implementations, different cameras may be used for different types of image or video capture, e.g., with different zoom levels (e.g., a telephoto lens, a wide angle lens, etc.). In some implementations, client device 120 may be configured to capture a 360 degree image or video. In some implementations, the cameras or lenses may capture an image using a single image sensor (e.g., a CCD or CMOS sensor), or a plurality of sensors. In some implementations, other sensors, e.g., a depth sensor, etc. may be used together with the one or more cameras at the time of image capture.

In some implementations, client device 120 may combine raw image data captured at the image sensor from one or more of the cameras (or lenses) and other data obtained from other sensors (e.g., accelerometer, gyroscope, location sensor, depth sensor, etc.) to form an image and store the image in a file container.

Client device 120 may enable a user to capture images in different modes, e.g., a static image (or photo) mode to capture a single frame, a burst or motion image mode to capture a plurality of frames, a video mode to capture a video that includes a plurality of frames, etc. In some implementations, method 400 may be performed at a time of image capture when the camera captures an image.

Client device 120 may enable a user to view images or videos, e.g., captured by the client device 120 or associated with the user, in different user interfaces. For example, a one-up mode or a slideshow mode may be provided that enables the user to view and/or edit a single image or video at a time. In another example, a gallery mode may be provided that enables the user to view and/or edit multiple images simultaneously, e.g., as an image grid. In some implementations, client device 120 may perform the method 400. In another example, a client device or server device can perform the method 400. In some implementations, method 400 may be implemented by a server device.

In block 402, it is checked whether user consent (e.g., user permission) has been obtained to use user data in the implementation of method 400. For example, user data can include images or videos captured by a user using a client devices, images or videos stored or accessed by a user, e.g., using a client device, image/video metadata, user data related to use of a messaging application, user preferences, user biometric information, user characteristics (e.g., identity, name, age, gender, profession, etc.), information about a user's social network and contacts, social and other types of actions and activities, content, ratings, and opinions created or submitted by a user, a user's current location, historical user data, images generated, received, and/or accessed by a user, images viewed or shared by a user, etc. One or more blocks of the methods described herein may use such user data in some implementations.

If user consent has been obtained from the relevant users for which user data may be used in the method 400, then in block 404, it is determined that the blocks of the methods herein can be implemented with possible use of user data as described for those blocks, and the method continues to block 410. If user consent has not been obtained, it is determined in block 406 that blocks are to be implemented without use of user data, and the method continues to block 410. In some implementations, if user consent has not been obtained, blocks are implemented without use of user data and with synthetic data and/or generic or publicly-accessible and publicly-usable data. In some implementations, if user consent has not been obtained, method 400 is not performed.

In block 410, image data is captured using one or more cameras, e.g., of a client device. In some implementations, the captured image data may include a primary image and associated depth values. In some implementations, the captured image data include one or more secondary images. In some implementations, the primary image may be a color image. In some implementations, the one or more secondary images may include a color image (e.g., obtained from a different viewpoint or at a different time than the primary image), a grayscale image, a monochrome image, a depth image (e.g., an image that includes depth information but not a human-viewable depiction of a scene), etc. In some implementations, the one or more secondary images may be captured by a camera different from a camera that captured the primary image. In some implementations, each of the one or more secondary images may be captured by a corresponding camera of the one or more cameras. Block 410 may be followed by block 412.

In block 412, the image data may be encoded in an image format, e.g., as a JPEG image, a TIFF image, a HEIF image, a PNG image, etc. In some implementations, the encoded image data may include the primary image, encoded in the image format. The encoded image data may further include image metadata. In some implementations, the image metadata may be encoded as XMP metadata. In some implementations, the image metadata may include a device element that includes a profile element indicative of an image type, e.g., Depth Photo, Augmented Reality (AR) photo, etc. In some implementations, the image metadata may further include a camera element that includes an image element and a depth map, the depth map obtained based on the depth values.

In some implementations, the depth map may include a plurality of pixel values that are each indicative of a respective distance from a particular camera of one or more cameras that were used to capture the image data. In some implementations, the depth may further include a lens focal model. In some implementations, the lens focal model may define a respective radius value of a circle of confusion corresponding to a plurality of distances from the particular camera. In some implementations, the plurality of distances may include a near distance (corresponding to a near plane) and a far distance (corresponding to a far plane), wherein the near distance is smaller than the far distance (near plane is closer to the camera than the far plane). In some implementations, the plurality of distances may further include a focus distance that is larger than the near distance and smaller than the far distance. In some implementations, the plurality of pixel values may be obtained by converting the depth values to an integer format (e.g., a 16-bit integer) and compressing the converted depth values based on the image format (e.g., JPEG).

In implementations that include one or more secondary images, the image metadata may further comprise one or more additional camera elements. Each additional camera element may correspond to at least one image of the one or more secondary images and may include a respective image element that includes a pointer (e.g., a uniform resource identifier) to the at least one image in a file container. In some implementations, the one or more additional camera elements may be organized sequentially in the image metadata after the first camera element. Block 412 may be followed by block 414.

In block 414, the encoded image data may be stored in a file container based on the image format. In some implementations, storing the image data in the file container may comprise concatenating the primary image and the one or more secondary images, encoded in the image format. An order of the primary image and the one or more secondary images in the file container may be the same as the order of the one or more additional camera elements in the image metadata. Block 414 may be followed by block 416.

In block 416, the primary image may be displayed.

Figure 5:
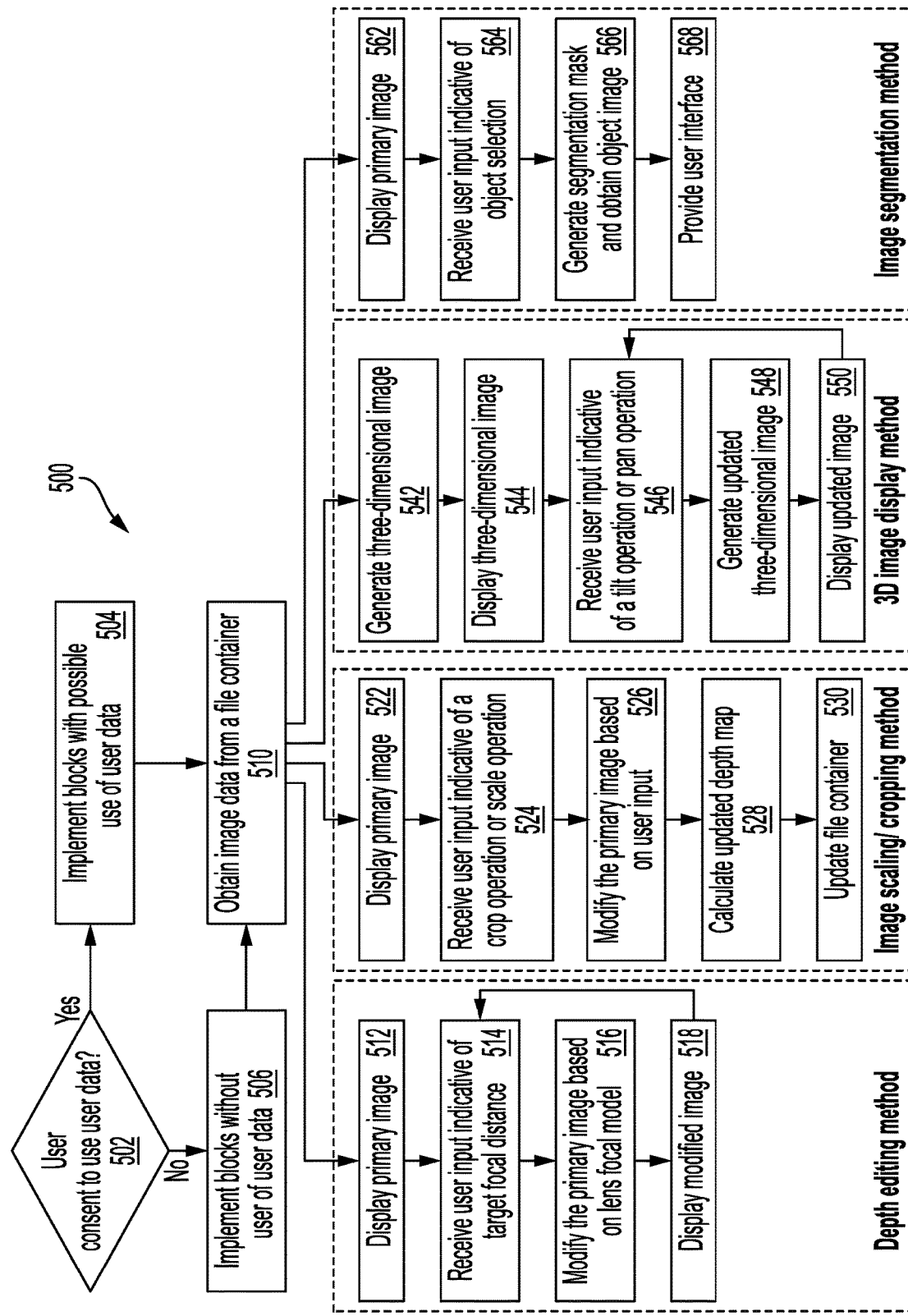
FIG. 5 is a flow diagram illustrating another example method, according to some implementations.

FIG. 5 is a flow diagram illustrating another example method 500, according to some implementations. In some implementations, method 500 can be implemented, for example, on a server system 102 as shown in FIG. 1. In some implementations, some or all of the method 500 can be implemented on one or more client devices 120, 122, 124, or 126 as shown in FIG. 1, one or more server devices, and/or on both server device(s) and client device(s). In the described examples, the implementing system includes one or more digital processors or processing circuitry ("processors"), and one or more storage devices. In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In various implementations, client device 120 can be a standalone camera, another device that includes a camera, e.g., smartphone, tablet, computer, wearable device such as a smartwatch, a headset, etc., or other client device that can receive images or videos captured by another device. In some implementations, client device 120 may be a capture-only device, e.g., a camera that does not include a screen. In some implementations, client device 120 may be a view-only device, e.g., a device that includes a screen on which images or videos can be displayed, but that does not have a camera or other capability to capture images or videos. In some implementations, client device 120 may have both capture and viewing capability.

In some implementations, client device 120 may include a single camera to capture images or videos. In some implementations, client device 120 may include a plurality of cameras (or lenses). For example, a smartphone or other device may include one or more front-facing cameras (on the same side of the device as a screen) and/or one or more rear-facing cameras. In some implementations, the one or more front-facing or rear-facing cameras may operate together during capture, e.g., a first camera may capture depth information and a second camera may capture image pixels of the image or video. In some implementations, different cameras may be used for different types of image or video capture, e.g., with different zoom levels (e.g., a telephoto lens, a wide angle lens, etc.). In some implementations, client device 120 may be configured to capture a 360 degree image or video. In some implementations, the cameras or lenses may capture an image using a single image sensor (e.g., a CCD or CMOS sensor), or a plurality of sensors. In some implementations, other sensors, e.g., a depth sensor, etc. may be used together with the one or more cameras at the time of image capture.

In some implementations, client device 120 may combine raw image data captured at the image sensor from one or more of the cameras (or lenses) and other data obtained from other sensors (e.g., accelerometer, gyroscope, location sensor, depth sensor, etc.) to form an image and store the image in a file container.

Client device 120 may enable a user to capture images in different modes, e.g., a static image (or photo) mode to capture a single frame, a burst or motion image mode to capture a plurality of frames, a video mode to capture a video that includes a plurality of frames, etc. In some implementations, method 500 may be performed at a time of image capture when the camera captures an image, after the capture is completed, or at a later time, e.g., when client device 120 is used by the user to view and/or edit an image.

Client device 120 may enable a user to view images or videos, e.g., captured by the client device 120 or associated with the user, in different user interfaces. For example, a one-up mode or a slideshow mode may be provided that enables the user to view and/or edit a single image or video at a time. In another example, a gallery mode may be provided that enables the user to view and/or edit multiple images simultaneously, e.g., as an image grid.

In some implementations, client device 120 may perform the method 500. In another example, a client device or server device can perform the method 500. In some implementations, method 500 may be implemented by a server device.

In block 502, it is checked whether user consent (e.g., user permission) has been obtained to use user data in the implementation of method 500. For example, user data can include images or videos captured by a user using a client devices, images or videos stored or accessed by a user, e.g., using a client device, image/video metadata, user data related to use of a messaging application, user preferences, user biometric information, user characteristics (e.g., identity, name, age, gender, profession, etc.), information about a user's social network and contacts, social and other types of actions and activities, content, ratings, and opinions created or submitted by a user, a user's current location, historical user data, images generated, received, and/or accessed by a user, images viewed or shared by a user, etc. One or more blocks of the methods described herein may use such user data in some implementations.

If user consent has been obtained from the relevant users for which user data may be used in the method 500, then in block 504, it is determined that the blocks of the methods herein can be implemented with possible use of user data as described for those blocks, and the method continues to block 510. If user consent has not been obtained, it is determined in block 506 that blocks are to be implemented without use of user data, and the method continues to block 510. In some implementations, if user consent has not been obtained, blocks are implemented without use of user data and with synthetic data and/or generic or publicly-accessible and publicly-usable data. In some implementations, if user consent has not been obtained, method 500 is not performed. For example, if the user denies permission to access one or more images, method 500 is not performed or is stopped after performing block 506.

In block 510, image data is obtained from a file container, e.g., a file container that stores an image in a particular image format, as described with reference to FIG. 3. In different implementations, block 510 may be followed by block 512, block 522, block 542, or block 562.

In some implementations, block 510 may be followed by block 512. In block 512, a primary image from the image data is caused to be displayed, e.g., on a display screen of a client device. In some implementations, the primary image may be displayed in a user interface that enables a user to provide user input. Block 512 may be followed by block 514.

In block 514, user input may be received indicative of a target focal distance. For example, the user interface may include a user interface element (e.g., a slider) that allows the user to choose the target focal distance by moving the slider between distance values that correspond to a near distance value and a far distance value in a captured image. In some implementations, user input may be received directly, e.g., as touch input, gesture input, voice input, etc. that identifies a particular portion of the primary image, and the focal distance may be determined based on the particular portion. Block 514 may be followed by block 516.

In block 516, the primary image may be modified based on a lens focal model, e.g., stored in the file container as part of image metadata. For example, the primary image may be modified to apply a portrait effect, e.g., in which objects in the image that are at a distance greater than the target focal distance are blurred; a bokeh effect, e.g., in which objects in the image that are at a different distance from a camera that captured the primary image than the target focal distance are blurred; other selective blur effects; etc. Other types of effects based on the target distance can also be applied, e.g., color effects, filters, etc.

In some implementations, the effect may be based on a FocalTable stored in the depth map in the image metadata. If the target focal distance corresponds to a distance included in the FocalTable, radius of the circle of confusion may be obtained by a simple lookup in the FocalTable. If the target focal distance is not included the Focal Table, radius values corresponding to available distances, e.g., distances nearest to the target focal distance may be obtained. For example, if the FocalTable includes distance-radius pairs for a near plane and a far plane, such values are obtained. Radius values for the target focal distance are then determined based on interpolation between the obtained values. For example, linear interpolation may be performed to obtain radius values for the target focal distance. The radius values thus determined are used to apply the effect, e.g., to blur the primary image. Block 516 may be followed by block 518.

In block 518, the modified image is caused to be displayed. In some implementations, block 518 may be followed by block 514, e.g., to allow the user to provide further input, e.g., indicative of a different target focal distance.

In some implementations, block 510 may be followed by block 522. In block 522, a primary image from the image data is caused to be displayed, e.g., on a display screen of a client device. In some implementations, the primary image may be displayed in a user interface that enables a user to provide user input. Block 522 may be followed by block 524.

In block 524, user input may be received indicative of a crop operation or a scale operation. For example, the user interface may include one or more user interface elements that enable the user to indicate the crop or scale operation. For example, the user may indicate a crop operation—removal of one or more portions of the primary image—by drawing a shape (e.g., a crop rectangle) to select a subset of pixels of the primary image. In another example, the user may indicate a scale operation—increasing a size of the primary image—by dragging one or more corners or edges of the primary image. Other types of user interfaces may be provided that enable the user to provide input of a crop or scale operation. Block 524 may be followed by block 526.

In block 526, the primary image is modified—cropped and/or scaled—based on the user input received in block 524. Block 526 may be followed by block 528.

In block 528, the depth map is updated based on the modified primary image. For example, portions of the depth map that correspond to portions of the primary image that were cropped out (removed) may be deleted. For a scale operation, the depth map may be updated based on the scaling applied to the modified primary image. Block 528 may be followed by block 530.

In block 530, the file container may be updated to store the modified primary image and the updated depth map.

In some implementations, block 510 may be followed by block 542. In block 542, a three-dimensional image is generated, e.g., using computer vision techniques. The image data obtained from the file container, which may include a primary image, one or more secondary images, and depth information is utilized to generate the three-dimensional image. For example, a plurality of depth maps may be included in the depth information, each depth map generated from motion with a single camera when capturing an image and may be embedded in the image metadata. In another example, the plurality of depth maps may be generated using one or more depth cameras. The plurality of depth maps can be utilized to reconstruct a 3D scene. Block 542 may be followed by block 544.

In block 544, the three-dimensional image is displayed. Block 544 may be followed by block 546.

In block 546, user input indicative of a tilt operation or a pan operation may be received. For example, user input may be received via one or more sensors of a client device, e.g., a gyroscope, an accelerometer, a gesture sensor, a touchscreen, or other sensors. Block 546 may be followed by block 548.

In block 548, an updated three-dimensional image may be generated based on the user input. The three-dimensional nature of the image enables objects to have solid depth and enables the image to be displayed such that an object may occlude other objects in the image when it is moved around. In some implementations, the effect may be analogous to looking into a 3D diorama. Block 548 may be followed by block 550.

In block 550 the updated three-dimensional image may be displayed. In some implementations, block 550 may be followed by block 546, to receive further user input.

In some implementations, block 510 may be followed by block 562. In block 562, a primary image from the image data is caused to be displayed, e.g., on a display screen of a client device. In some implementations, the primary image may be displayed in a user interface that enables a user to provide user input. Block 522 may be followed by block 524.

In block 564, user input may be received indicative of selection of one or more objects in the image. For example, the user may select an object using a pointing device, a touchscreen, a gesture interface, voice, etc. Block 564 may be followed by block 566.

In block 566, a segmentation mask is generated corresponding to the user selected object(s). The segmentation mask may identify a subset of pixels of the primary image that correspond to the object. The segmentation mask may be generated using the depth map that includes a plurality of depth values. In some implementations, each depth value may correspond to a particular pixel of the primary image. In these implementations, generating the segmentation mask may include selecting pixels of the primary image with respective depth values that are within a threshold range of depth values. For example, the threshold range of depth values may be a range between a minimum depth value and a maximum depth value that corresponds to the object, e.g., identified using image segmentation techniques that utilize the depth information and information regarding the depth of field effect applied by a camera application that was used during the capture of the image. An object image is obtained based on the segmentation mask, e.g., the object may only include the subset of pixels of the primary image that are identified by the segmentation mask. For example, referring to FIG. 2B, the dark flower in the depth image 230 may be utilized to segment out the flower in the image 220. Block 566 may be followed by block 568.

In block 568, a user interface may be provided that enables a user to select the object image and perform one or more operations, e.g., a cut operation to remove the object from the displayed image, a copy operation to copy the object, or a paste operation to insert the object into a different image or at a different position in the displayed image.

Figure 6:
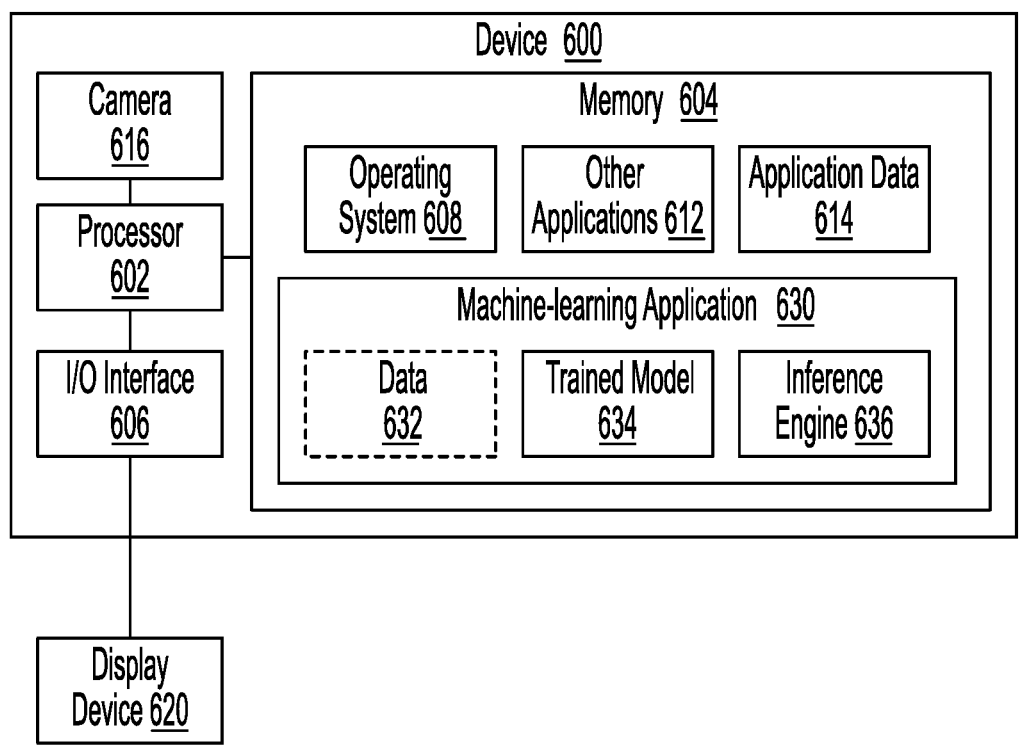
FIG. 6 is a block diagram of an example device which may be used for one or more implementations described herein.

FIG. 6 is a block diagram of an example device 600 which may be used to implement one or more features described herein. In one example, device 600 may be used to implement a client device, e.g., any of client devices (120, 122, 124, 126) shown in FIG. 1. Alternatively, device 600 can implement a server device, e.g., server 104. In some implementations, device 600 may be used to implement a client device, a server device, or both client and server devices. Device 600 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 600 includes a processor 602, a memory 604, input/output (I/O) interface 606, and camera 616. In some implementations, camera 616 may include a plurality of cameras or imaging sensors. For example, camera 616 may include a front camera and a rear camera, e.g., when device 600 is a mobile phone, tablet, or computer device. In another example, camera 616 may include a camera. e.g., that captures RGB images, a depth camera that captures depth information, e.g., using infrared or other techniques, a grayscale camera, a monochrome camera, etc.

Processor 602 can be one or more processors and/or processing circuits to execute program code and control basic operations of the device 600. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 602 may include one or more co-processors that implement neural-network processing. In some implementations, processor 602 may be a processor that processes data to produce probabilistic output, e.g., the output produced by processor 602 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, machine-learning application 630, other applications 612, and application data 614.

Other applications 612 ay include applications such as a camera application, an image gallery, image management, or image library application, media sharing application, data display engine, web hosting engine, image display engine, notification engine, social networking engine, etc. In some implementations, the machine-learning application 630 and other applications 612 can each include instructions that enable processor 602 to perform functions described herein, e.g., some or all of the methods of FIGS. 4 and 5. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 630 may utilize Bayesian classifiers, support vector machines, neural networks, or other learning techniques. In some implementations, machine-learning application 630 may include a trained model 634, an inference engine 636, and data 632.

In some implementations, data 632 may include training data, e.g., data used to generate trained model 634. For example, training data may include any type of data such as text, images, audio, video, etc. Training data may be obtained from any source, e.g., a data repository specifically marked for training, data for which permission is provided for use as training data for machine-learning, etc. In implementations where one or more users permit use of their respective user data to train a machine-learning model, e.g., trained model 634, training data may include such user data. In implementations where users permit use of their respective user data, data 632 may include permitted data such as images/videos or image/video metadata (e.g., videos, data regarding sharing of videos with other users, labels associated with videos, whether a video-based creation such as a video collage, a story, etc. was generated from a video, etc.), communications (e.g., e-mail; chat data such as text messages, voice, video, etc.), documents (e.g., spreadsheets, text documents, presentations, etc.)

In some implementations, training data may include synthetic data generated for the purpose of training, such as data that is not based on user input or activity in the context that is being trained, e.g., data generated from simulated or computer-generated videos, etc. In some implementations, machine-learning application 630 excludes data 632. For example, in these implementations, the trained model 634 may be generated, e.g., on a different device, and be provided as part of machine-learning application 630. In various implementations, the trained model 634 may be provided as a data file that includes a model structure or form (e.g., that defines a number and type of neural network nodes, connectivity between nodes and organization of the nodes into a plurality of layers), and associated weights. Inference engine 636 may read the data file for trained model 634 and implement a neural network with node connectivity, layers, and weights based on the model structure or form specified in trained model 634.

Machine-learning application 630 also includes a trained model 634. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 632 or application data 614. Such data can include, for example, one or more pixels per node, e.g., when the trained model is used for analysis, e.g., of a video that includes a plurality of frames. Subsequent intermediate layers may receive as input, output of nodes of a previous layer per the connectivity specified in the model form or structure. These layers may also be referred to as hidden layers. A final layer (e.g., output layer) produces an output of the machine-learning application. In some implementations, model form or structure also specifies a number and/ or type of nodes in each layer.

In different implementations, trained model 634 can include one or more models. One or more of the models may include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/ activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 634 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 632, to produce a result.

For example, training may include applying supervised learning techniques. In supervised learning, the training data can include a plurality of inputs (e.g., a set of videos) and a corresponding expected output for each input (e.g., one or more labels for each video). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner.

In various implementations, a trained model includes a set of weights, or embeddings, corresponding to the model structure. In implementations where data 632 is omitted, machine-learning application 630 may include trained model 634 that is based on prior training, e.g., by a developer of the machine-learning application 630, by a third-party, etc. In some implementations, trained model 634 may include a set of weights that are fixed, e.g., downloaded from a server that provides the weights.

Machine-learning application 630 also includes an inference engine 636. Inference engine 636 is configured to apply the trained model 634 to data, such as application data 614 (e.g., videos), to provide an inference. In some implementations, inference engine 636 may include software code to be executed by processor 602. In some implementations, inference engine 636 may specify circuit configuration (e.g., for a programmable processor, for a field programmable gate array (FPGA), etc.) that enables processor 602 to apply the trained model. In some implementations, inference engine 636 may include software instructions, hardware instructions, or a combination. In some implementations, inference engine 636 may offer an application programming interface (API) that can be used by operating system 608 and/or other applications 612 to invoke inference engine 636, e.g., to apply trained model 634 to application data 614 to generate an inference.

In some implementations, machine-learning application 630 may be implemented in an offline manner. In these implementations, trained model 634 may be generated in a first stage, and provided as part of machine-learning application 630. In some implementations, machine-learning application 630 may be implemented in an online manner. For example, in such implementations, an application that invokes machine-learning application 630 (e.g., operating system 608, one or more of other applications 612, etc.) may utilize an inference produced by machine-learning application 630, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 634, e.g., to update embeddings for trained model 634.

In some implementations, machine-learning application 630 may be implemented in a manner that can adapt to particular configuration of device 600 on which the machine-learning application 630 is executed. For example, machine-learning application 630 may determine a computational graph that utilizes available computational resources, e.g., processor 602. For example, if machine-learning application 630 is implemented as a distributed application on multiple devices, machine-learning application 630 may determine computations to be carried out on individual devices in a manner that optimizes computation. In another example, machine-learning application 630 may determine that processor 602 includes a GPU with a particular number of GPU cores (e.g., 1000) and implement the inference engine accordingly (e.g., as 1000 individual processes or threads).

In some implementations, machine-learning application 630 may implement an ensemble of trained models. For example, trained model 634 may include a plurality of trained models that are each applicable to same input data. In these implementations, machine-learning application 630 may choose a particular trained model, e.g., based on available computational resources, success rate with prior inferences, etc. In some implementations, machine-learning application 630 may execute inference engine 636 such that a plurality of trained models is applied. In these implementations, machine-learning application 630 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 608 or one or more applications 612. In some implementations, machine-learning application 630 may produce an output based on a format specified by an invoking application, e.g. operating system 608 or one or more applications 612. In some implementations, an invoking application may be another machine-learning application. For example, such configurations may be used in generative adversarial networks, where an invoking machine-learning application is trained using output from machine-learning application 630 and vice-versa.

Any of software in memory 604 can alternatively be stored on any other suitable storage location or computer-readable medium. In addition, memory 604 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. Interfaced devices can be included as part of the device 600 or can be separate and communicate with the device 600. For example, network communication devices, storage devices (e.g., memory), and input/output devices can communicate via I/O interface 606. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 606 can include one or more display devices 620 that can be used to display content, e.g., images, video, and/or a user interface of an output application as described herein. Display device 620 can be connected to device 600 via local connections (e.g., display bus) and/or via networked connections and can be any suitable display device. Display device 620 can include any suitable display device such as an LCD, LED, or plasma display screen, CRT, television, monitor, touchscreen, 3-D display screen, or other visual display device. For example, display device 620 can be a flat display screen provided on a mobile device, multiple display screens provided in a goggles or headset device, or a monitor screen for a computer device.

The I/O interface 606 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

Camera 616 may be any type of camera that can capture a video that includes a plurality of frames. Camera as used herein can include any image capture device. In some implementations, camera 616 may include a plurality of lenses or imaging sensors that have different capabilities, e.g., front-facing vs. rear-facing, different zoom levels, image resolutions of captured images, etc. In some implementations, device 600 may include one or more sensors, such as a depth sensor, an accelerometer, a location sensor (e.g., GPS), a gyroscope, etc. In some implementations, the one or more sensors may be operated together with the camera to obtain sensor readings corresponding to different frames of the video captured using the camera.

For ease of illustration, FIG. 6 shows one block for each of processor 602, memory 604, I/O interface 606, camera 616, and software blocks 608, 612, and 630. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While some components are described as performing blocks and operations as described in some implementations herein, any suitable component or combination of components of network environment 100, device 600, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   capturing image data using one or more cameras, wherein the image data includes a primary image and associated depth values;
   encoding the image data in an image format, wherein the encoded image data includes:
      the primary image, encoded in the image format; and
      image metadata that includes:
         a device element that includes a profile element indicative of an image type; and
         a first camera element, wherein the first camera element includes an image element and a depth map based on the depth values, wherein the depth map comprises a plurality of pixel values, each pixel value indicative of a respective distance from a particular camera of the one or more cameras and a lens focal model that defines a respective radius value of a circle of confusion corresponding to a plurality of distances from the particular camera;
   after the encoding, storing the image data in a file container based on the image format; and
   causing the primary image to be displayed.

2. The computer-implemented method of claim 1, wherein the plurality of distances include a near distance and a far distance, wherein the near distance is smaller than the far distance.

3. The computer-implemented method of claim 2, wherein the plurality of distances further includes a focus distance that is larger than the near distance and smaller than the far distance.

4. The computer-implemented method of claim 1, further comprising obtaining the plurality of pixel values by converting the depth values to an integer format and compressing the converted depth values based on the image format.

5. The computer-implemented method of claim 1, wherein the image data further comprises one or more secondary images, wherein each secondary image is captured by a respective camera of the one or more cameras different from the particular camera.

6. The computer-implemented method of claim 5, wherein
   the image metadata further comprises one or more additional camera elements wherein each additional camera element corresponds to at least one image of the one or more secondary images and includes a respective image element that includes a pointer to the at least one image, wherein the one or more additional camera elements are organized sequentially in the image metadata after the first camera element, and
   wherein storing the image data in the file container comprises concatenating the primary image and the one or more secondary images, encoded in the image format, wherein an order of the primary image and the one or more secondary images in the file container is same as the order of the one or more additional camera elements in the image metadata.

7. The computer-implemented method of claim 1, wherein the image data further comprises one or more secondary images that are each captured by a respective camera of the one or more cameras.

8. The computer-implemented method of claim 7, wherein the one or more secondary images include a depth image captured by a depth camera or a video.

9. The computer-implemented method of claim 1, further comprising:
   causing the primary image to be displayed;
   receiving user input indicative of a target focal distance;
   in response to the user input, modifying one or more pixel values of the primary image based on the lens focal model to obtain a modified image, wherein objects in the modified image that are at the target focal distance are in focus; and
   causing the modified image to be displayed.

10. The computer-implemented method of claim 9, wherein the lens focal model defines a respective radius value of a circle of confusion corresponding to a plurality of distances from a camera that captured the primary image, and wherein modifying the one or more pixel values causes one or more objects in the primary image to be blurred, wherein the one or more objects are associated with depth data that indicates that the one or more objects are at a different distance from the camera that captured the primary image than the target focal distance.

11. The computer-implemented method of claim 1, further comprising:
   causing the primary image to be displayed;
   receiving user input indicative of at least one of: a crop operation on the primary image or a scale operation on the primary image;

modifying the primary image based on the user input to obtain a modified image;

calculating an updated depth map, wherein the updated depth map includes depth data corresponding to the modified image; and updating the file container to replace the primary image with the modified image and the depth map with the updated depth map.

12. The computer-implemented method of claim 1, further comprising:

causing the primary image to be displayed;

receiving user input indicative of selection of an object depicted in the primary image;

generating a segmentation mask based on the depth map, wherein the segmentation mask identifies a subset of pixels of the primary image that correspond to the object;

obtaining an object image of the object based on the segmentation mask; and providing a user interface that enables selection of the object image.

13. The computer-implemented method of claim 12, wherein the depth map includes a plurality of depth values, each corresponding to a particular pixel of the primary image, and wherein generating the segmentation mask comprises selecting pixels of the primary image with respective depth values that are within a threshold range of depth values.

14. A non-transitory computer-readable storage medium comprising instructions that, when executed by one or more processors, cause the one or more processors to perform operations comprising:

capturing image data using one or more cameras, wherein the image data includes a primary image and associated depth values;

obtaining a plurality of pixel values by converting the depth values to an integer format and compressing the converted depth values based on an image format;

encoding the image data in the image format, wherein the encoded image data includes:

the primary image, encoded in the image format; and image metadata that includes:

a device element that includes a profile element indicative of an image type; and a first camera element, wherein the first camera element includes an image element and a depth map based on the depth values, wherein the depth map comprises the plurality of pixel values, each pixel value indicative of a respective distance from a particular camera of the one or more cameras;

after the encoding, storing the image data in a file container based on the image format; and causing the primary image to be displayed.

15. The computer-readable storage medium of claim 14, wherein the operations further comprise:

causing the primary image to be displayed;

receiving user input indicative of at least one of: a crop operation on the primary image or a scale operation on the primary image;

modifying the primary image based on the user input to obtain a modified image;

calculating an updated depth map, wherein the updated depth map includes depth data corresponding to the modified image; and updating the file container to replace the primary image with the modified image and the depth map with the updated depth map.

16. A computing device comprising:

one or more processors; and a memory coupled to the one or more processors with instructions stored thereon that, when executed by the one or more processors, cause the one or more processors to perform operations comprising:

capturing image data using one or more cameras, wherein the image data includes a primary image and associated depth values;

obtaining a plurality of pixel values by converting the depth values to an integer format and compressing the converted depth values based on an image format;

encoding the image data in the image format, wherein the encoded image data includes:

the primary image, encoded in the image format; and image metadata that includes:

a device element that includes a profile element indicative of an image type; and a first camera element, wherein the first camera element includes an image element and a depth map based on the depth values, wherein the depth map comprises the plurality of pixel values, each pixel value indicative of a respective distance from a particular camera of the one or more cameras;

after the encoding, storing the image data in a file container based on the image format; and causing the primary image to be displayed.

* * * * *